US012668046B2

(12) United States Patent
Sim et al.

(10) Patent No.: US 12,668,046 B2
(45) Date of Patent: Jun. 30, 2026

(54) COMPOSITE STRUCTURE DENTAL ORTHODONTIC SHEET AND DENTAL ORTHODONTIC DEVICE USING THE SAME

(71) Applicant: DENTIS CO., LTD., Daegu (KR)

(72) Inventors: Gi Bong Sim, Daegu (KR); Hee Seok Park, Daegu (KR); Byeong Il Kim, Gyeongsan-si (KR); Eun Yeong Park, Daegu (KR); Won Gun Chang, Seoul (KR)

(73) Assignee: DENTIS CO., LTD., Daegu (KR)

( * ) Notice: Subject to any disclaimer, the term of this patent is extended or adjusted under 35 U.S.C. 154(b) by 424 days.

(21) Appl. No.: 18/203,487

(22) Filed: May 30, 2023

(65) Prior Publication Data

US 2024/0075724 A1      Mar. 7, 2024

(30) Foreign Application Priority Data

Sep. 6, 2022      (KR) ........................ 10-2022-0112775

(51) Int. Cl.
| | |
|---|---|
| *A61C 7/08* | (2006.01) |
| *B32B 5/02* | (2006.01) |
| *B32B 27/06* | (2006.01) |
| *B32B 27/12* | (2006.01) |

(52) U.S. Cl.
CPC .............. *B32B 27/12* (2013.01); *B32B 5/028* (2013.01); *B32B 27/06* (2013.01); *A61C 7/08*

(2013.01); *B32B 2250/03* (2013.01); *B32B 2307/7376* (2023.05); *B32B 2535/00* (2013.01)

(58) Field of Classification Search
None
See application file for complete search history.

(56) References Cited

U.S. PATENT DOCUMENTS

| | | | | |
|---|---|---|---|---|
| 5,112,640 A | * | 5/1992 | Warunek ................. | A61L 27/34 |
| | | | | 427/322 |
| 2005/0136370 A1 | * | 6/2005 | Brennan ................ | A61C 7/146 |
| | | | | 206/63.5 |

FOREIGN PATENT DOCUMENTS

JP          2011-523872 A          8/2011

* cited by examiner

*Primary Examiner* — Sheeba Ahmed
(74) *Attorney, Agent, or Firm* — Stein IP, LLC

(57) ABSTRACT

Disclosed is a dental orthodontic sheet having a composite structure in which different materials are stacked and bound to each other. The composite structure dental orthodontic sheet includes a first sheet layer, a second sheet layer, and an intermediate sheet layer formed between the first sheet layer and the second sheet layer, wherein the intermediate sheet layer includes a mat portion made of a softer material than each of the first sheet layer and the second sheet layer, the mat portion being formed so as to have a mesh structure, and a binding portion configured to allow mesh holes of the mat portion to be filled with materials of the first sheet layer and the second sheet layer such that the first sheet layer and the second sheet layer are bound to each other.

15 Claims, 9 Drawing Sheets

131

131

131

( FLEXURAL STRENGTH )

( TRACTIVE FORCE TEST )

COMPOSITE STRUCTURE DENTAL ORTHODONTIC SHEET AND DENTAL ORTHODONTIC DEVICE USING THE SAME

CROSS-REFERENCE TO RELATED APPLICATION

This application claims priority from Korean Patent Application No. 10-2022-0112775, filed on Sep. 6, 2022, in the Korean Intellectual Property Office, the disclosure of which is incorporated herein by reference in its entirety.

BACKGROUND OF THE INVENTION

1. Field of the Invention

The present invention relates to a dental orthodontic sheet having a composite structure in which different materials are stacked and bound to each other and a dental orthodontic device using the same.

2. Description of the Related Art

In general, irregular dentition, dental malocclusion, facial asymmetry, or upsweep mostly occur as the result of teeth or the mouth and maxilla not properly growing in place due to dental or maxilla anomalies, bad habits that affect teeth, or heredity.

Such several abnormal conditions have a somewhat negative impact upon first impressions of an individual and cause discomfort in daily life, such as ingestion of food. This is a reason that interest in dental orthodontics or maxilla and mandible orthopedics continues.

The principle of dental orthodontics uses the nature of teeth in which, when force is applied to the teeth, the teeth are moved by the force applied thereto. There are several dental orthodontic methods, one of which is a method of fixing brackets to teeth and connecting the brackets to each other using a wire. Since each of the brackets and the wire is made of a metal, however, the brackets and the wire are easily visible, and it is inconvenient to manage the brackets and the wire.

Another dental orthodontic method is a method using a transparent orthodontic device. The transparent orthodontic device is not easily visible from the outside, and is freely mounted and removed as needed. For these reasons, many adults use the transparent orthodontic device.

In general, the transparent orthodontic device is manufactured as follows. First, the initial tooth state of a dental patient is scanned, teeth scan data are processed using a program that creates orthodontic teeth, and the teeth are gradually moved to predetermined final teeth positions, whereby a digital teeth orthodontic model is created for each step. Subsequently, the digital teeth orthodontic model for each step is output as a tooth mold using a three-dimensional (3D) printer, and thermoforming plastic is shaped on the output tooth mold by pressing, whereby a transparent orthodontic device is manufactured.

The thermoforming plastic used to manufacture the transparent orthodontic device is provided in the form of a sheet, and is shaped by pressing. Basically, there are physical properties required for a transparent orthodontic sheet.

That is, the transparent orthodontic sheet must be formed so as to have predetermined strength such that the orthodontic device is imparted with orthodontic force, and retentive force of the transparent orthodontic sheet must be high. In addition, since the transparent orthodontic sheet is mounted and separated for a long time, durability of the transparent orthodontic sheet must be guaranteed.

Conventional transparent orthodontic sheets are formed so as to have a single-layered structure or a multilayered structure.

For a single-layered sheet, which is made of a single material, a hard material is used in order to impart orthodontic force. In this case, however, a patient suffers great pain in the initial wearing stage, and orthodontic force is lowered over time, whereby retentive force is reduced. As a result, unexpected movement of teeth occurs, whereby dental orthodontic treatment is not properly performed.

In order to solve this problem, a multilayered sheet configured such that a relatively soft material is formed between relatively hard materials may be provided. As shown in FIG. 1, however, adhesive force at the interface between difference materials is low, whereby a peeling phenomenon occurs, which leads to reduction in durability.

In addition, repulsive force of teeth against orthodontic force having predetermined strength may be applied to the sheet. As shown in FIG. 2, an intermediate layer extends throughout the sheet, and therefore the sheet may be deformed or stretched over time.

In particular, for a multilayered sheet including a soft layer, strain of the soft material is high, and the recovery rate of the soft material due to stretching thereof is gradually reduced. When the sheet eventually exceeds an elongation limit point, the sheet cannot exhibit orthodontic force. In addition, reduction in force of adhesion between different materials due to deformation or stretching of the soft material is accelerated.

SUMMARY OF THE INVENTION

It is an object of the present invention to provide a composite structure dental orthodontic sheet configured such that a soft material and a hard material are stacked and bound to each other, whereby orthodontic force and retentive force are increased while durability is improved, and a dental orthodontic device using the same.

In accordance with the present invention, the above and other objects can be accomplished by the provision of a composite structure dental orthodontic sheet including a first sheet layer, a second sheet layer, and an intermediate sheet layer formed between the first sheet layer and the second sheet layer, wherein the intermediate sheet layer includes a mat portion made of a softer material than each of the first sheet layer and the second sheet layer, the mat portion being formed so as to have a mesh structure, and a binding portion configured to allow mesh holes of the mat portion to be filled with materials of the first sheet layer and the second sheet layer such that the first sheet layer and the second sheet layer are bound to each other, and a dental orthodontic device using the same.

The first sheet layer and the second sheet layer may be made of the same material or different materials.

Each of the first sheet layer and the second sheet layer may include at least one selected from among glycol modified polyethylene terephthalate (PETG), polyester, co-polyester, polypropylene, polyethylene, acrylic, polyetheretherketone, polyamide, polyethylene terephthalate, polybutylene terephthalate, polyetherimide, polyethersulfone, polytrimethylene terephthalate, and thermoplastic polyurethane.

The first sheet layer and the second sheet layer are formed so as to have the same thickness or different thicknesses. Each of the first sheet layer and the second sheet layer may have a thickness of 200 to 700 μm.

The mat portion of the intermediate sheet layer may include at least one selected from among silicone rubber, elastomeric alloy, thermoplastic elastomer (TPE), thermoplastic vulcanizate (TPV) elastomer, polyolefin blend elastomer, thermoplastic co-polyester elastomer, thermoplastic polyamide elastomer, thermoplastic polyurethane (TPU), elastomeric alloy, thermoplastic elastomer (TPE), thermoplastic vulcanizate (TPV) elastomer, thermoplastic co-polyester elastomer, and polyester elastomer.

The intermediate sheet layer may have a thickness of 50 to 500 µm.

The mesh structure of the mat portion may have a regular pattern or an irregular pattern. The mesh structure of the mat portion may be formed as the result of repetition of sparse and dense structures. The mesh structure of the mat portion may be formed in vertical asymmetry.

The intermediate sheet layer may be configured such that the ratio in area of the binding portion to the mat portion is 30 to 70%.

A buffer coating layer may be further formed on a surface of the mesh structure of the mat portion. The buffer coating layer may be made of a material that exhibits strength equal to or less than strength of each of the first sheet layer and the second sheet layer.

A surface of the mat portion of the intermediate sheet layer may be treated with plasma.

Each of the first sheet layer and the second sheet layer may have a flexural strength of 30 to 60 MPa, and the intermediate sheet layer may have a flexural strength of 15 to 25 MPa.

The composite structure dental orthodontic sheet may be formed by stacking the first sheet layer, the intermediate sheet layer, and the second sheet layer and pressing the first sheet layer, the intermediate sheet layer, and the second sheet layer through a hot press rolling process.

4

Figure 14:
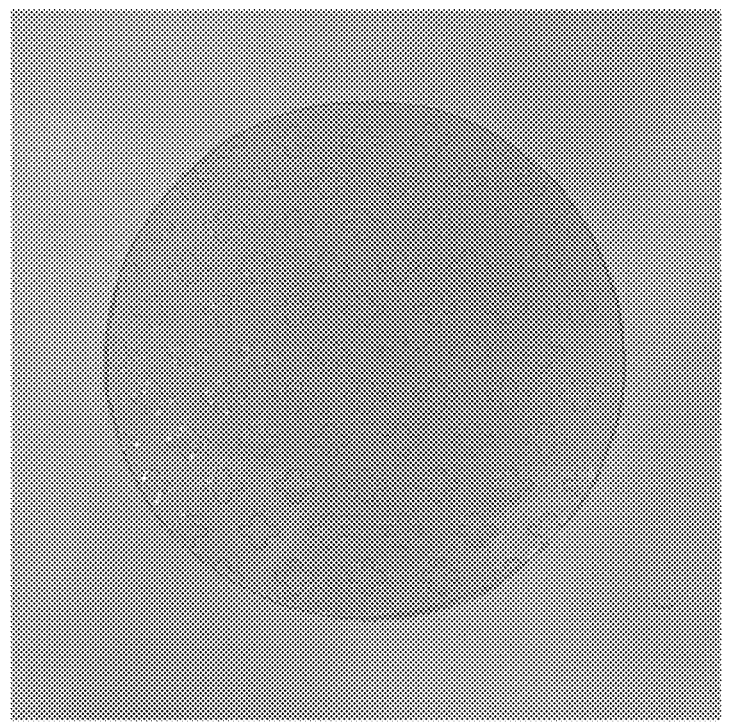
Figure 15:
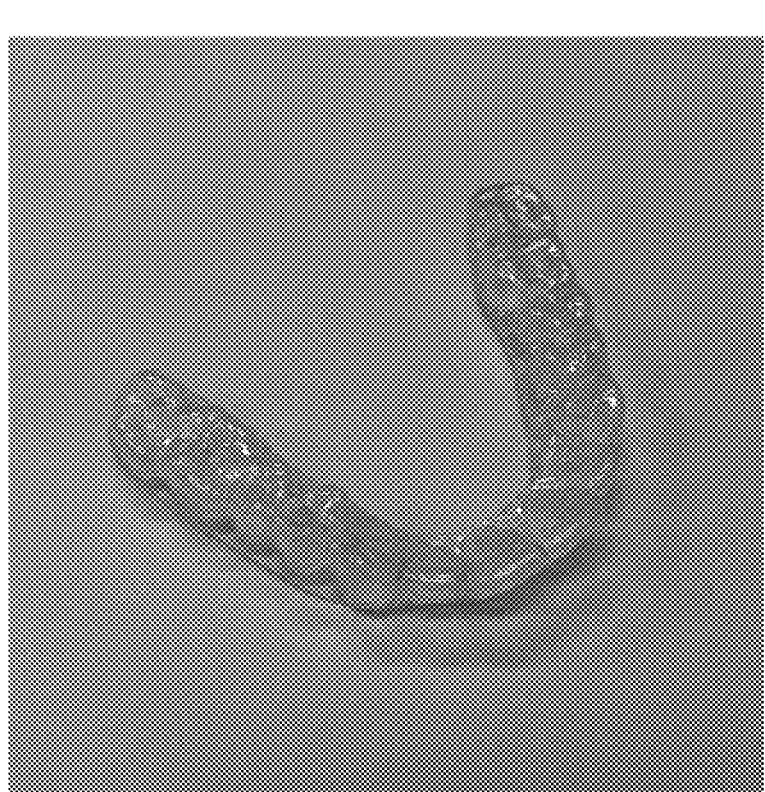

FIG. 14 is an actual photograph showing the dental orthodontic sheet according to the embodiment of the present invention; and FIG. 15 is an actual photograph showing a dental orthodontic device manufactured using the dental orthodontic sheet according to the embodiment of the present invention.

DETAILED DESCRIPTION OF THE PREFERRED EMBODIMENTS

The present invention relates to a dental orthodontic sheet having a composite structure in which different materials are stacked and bound, and more particularly to a hybrid composite structure dental orthodontic sheet including a soft material and a hard material.

Hereinafter, the present invention will be described in detail with reference to the accompanying drawings.

Figure 3:
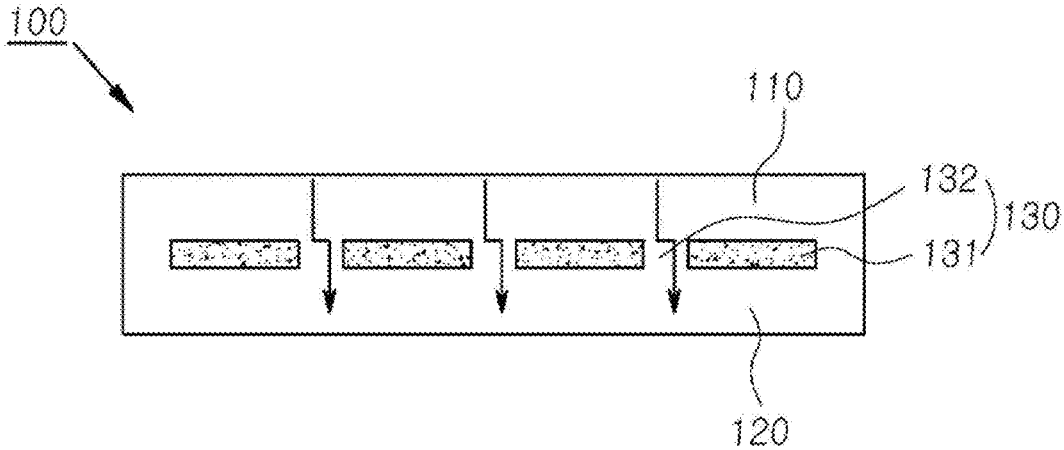
FIG. 3 is a sectional schematic view of a dental orthodontic sheet according to an embodiment of the present invention.
Figure 4A:
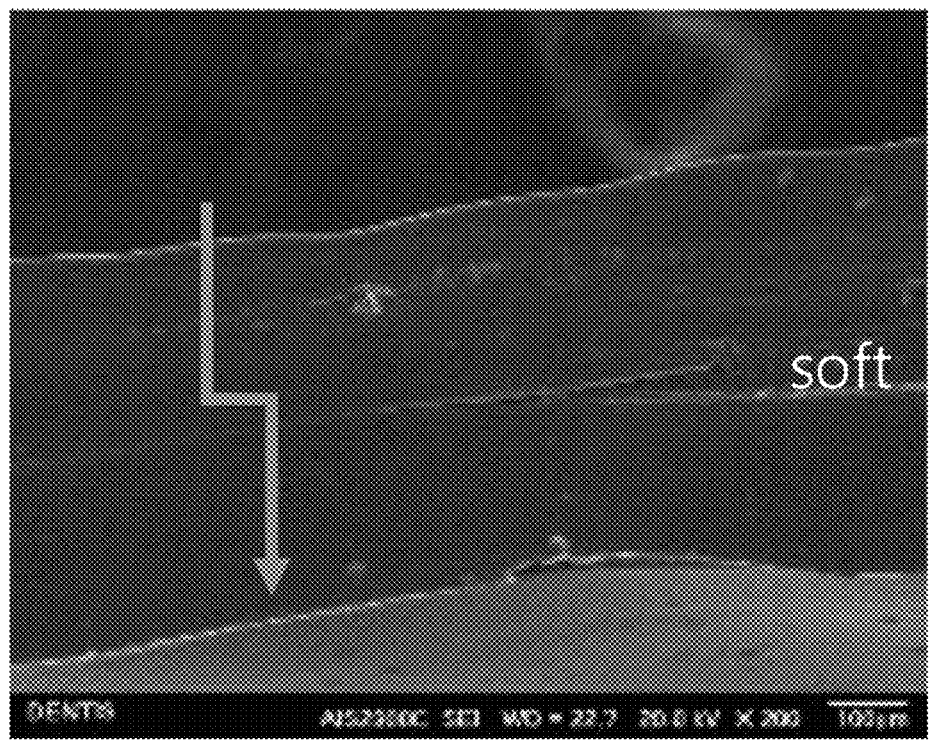
FIGS. 4A and 4B are electron micrographs showing the section of the dental orthodontic sheet according to the embodiment of the present invention.
Figure 4B:
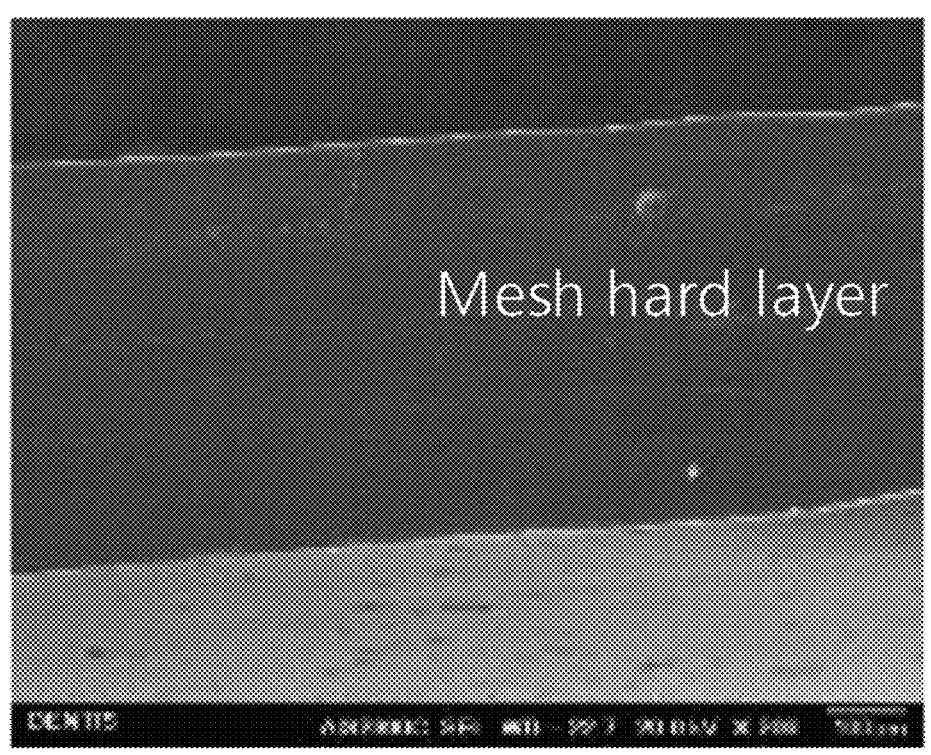
Figure 5:
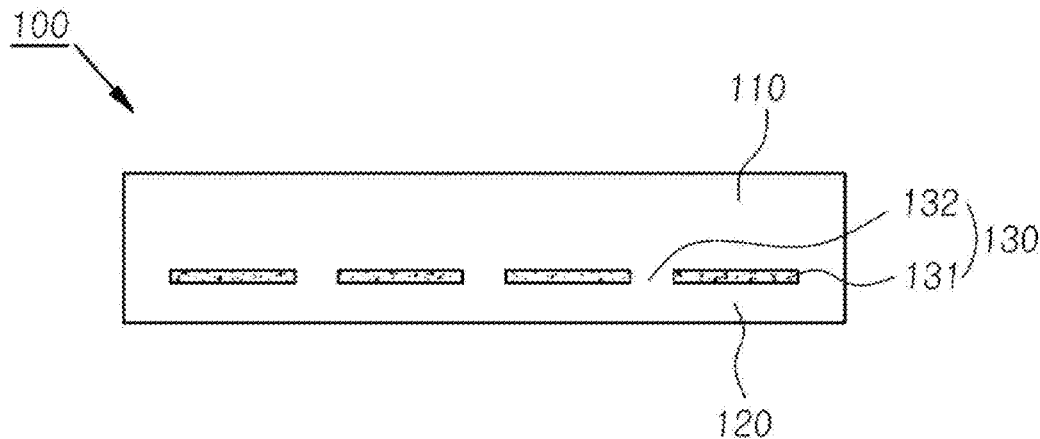
FIGS. 5 to 7 are sectional schematic views of dental orthodontic sheets according to various embodiments of the present invention.
Figure 6:
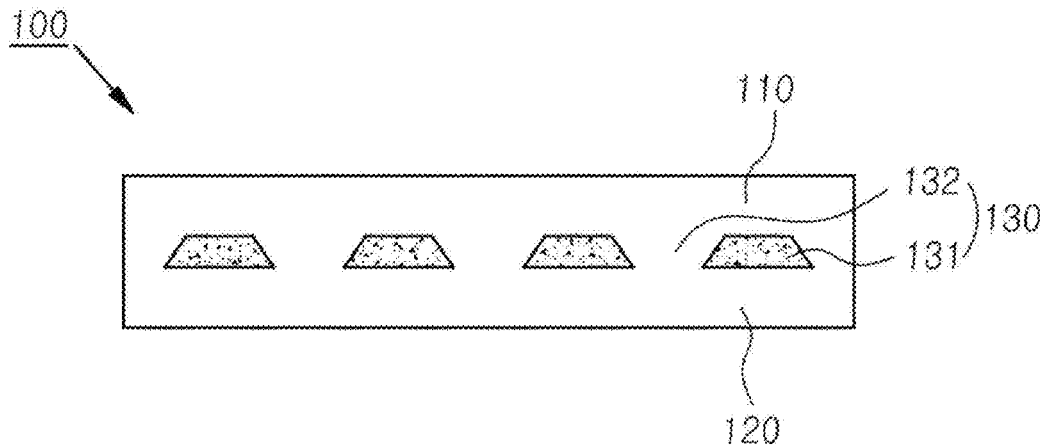
Figure 7:
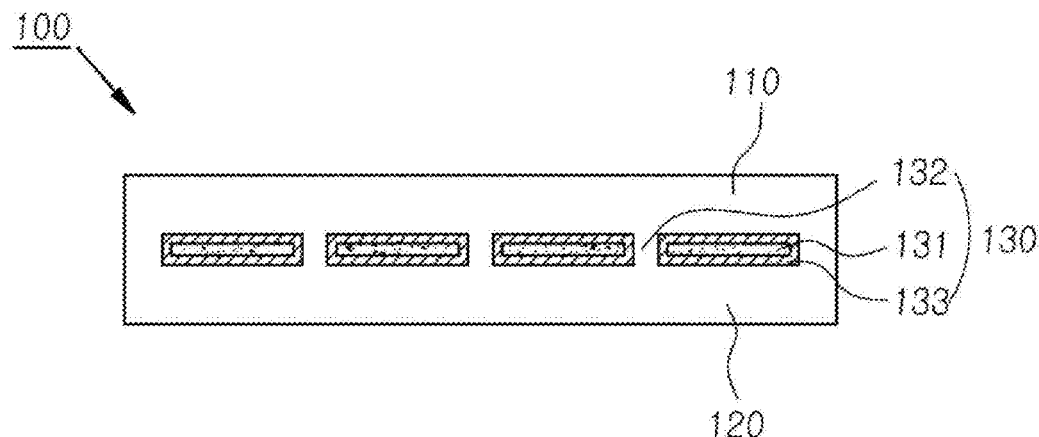
Figure 8A:
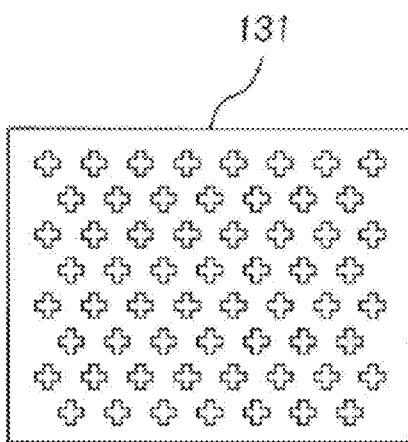
FIGS. 8A, 8B, 8C, 8D, 8E, and 8F are schematic views showing various embodiments of a mat portion of an intermediate sheet layer according to the present invention.
Figure 8B:
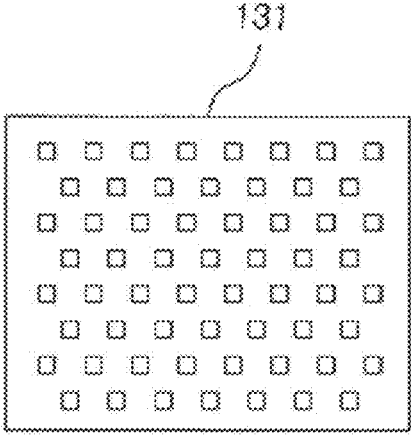
Figure 8C:
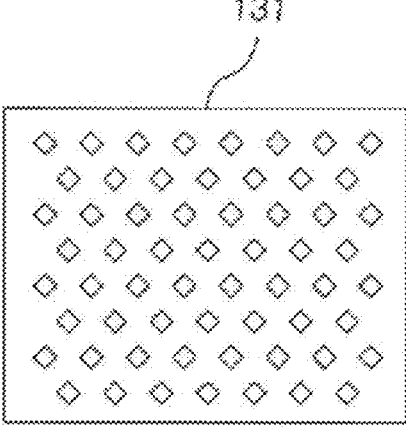
Figure 8D:
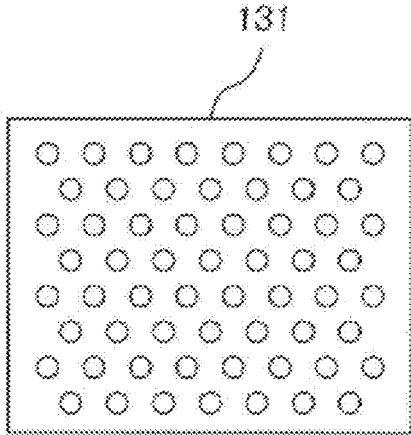
Figure 8E:
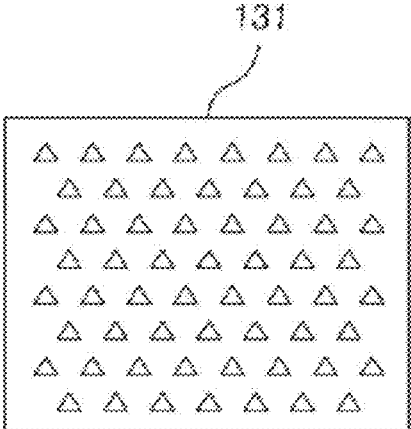
Figure 8F:
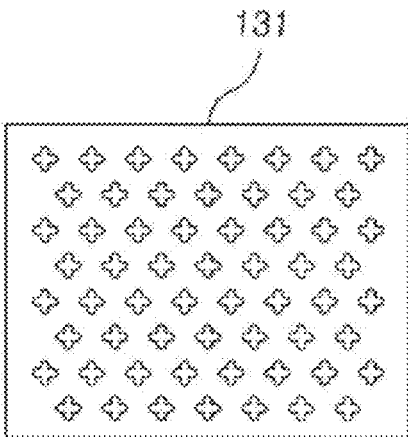
Figure 9:
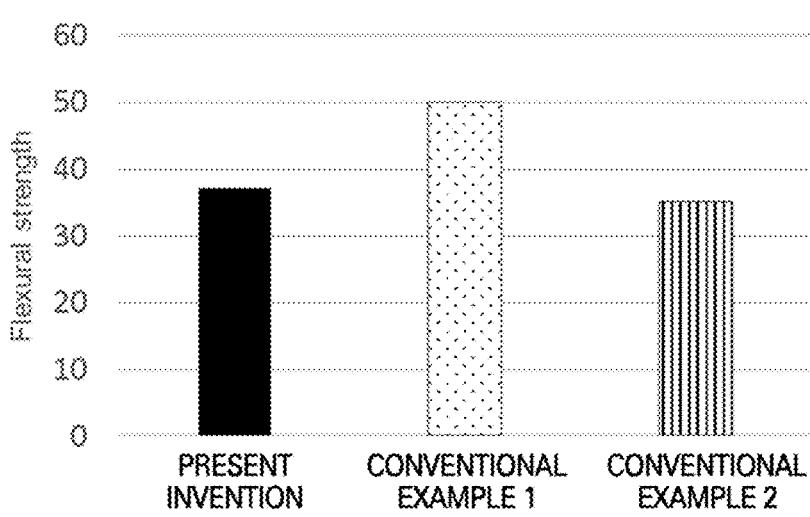
FIG. 9 is a view showing flexural strength data according to the embodiment of the present invention and conventional examples.
Figure 10:
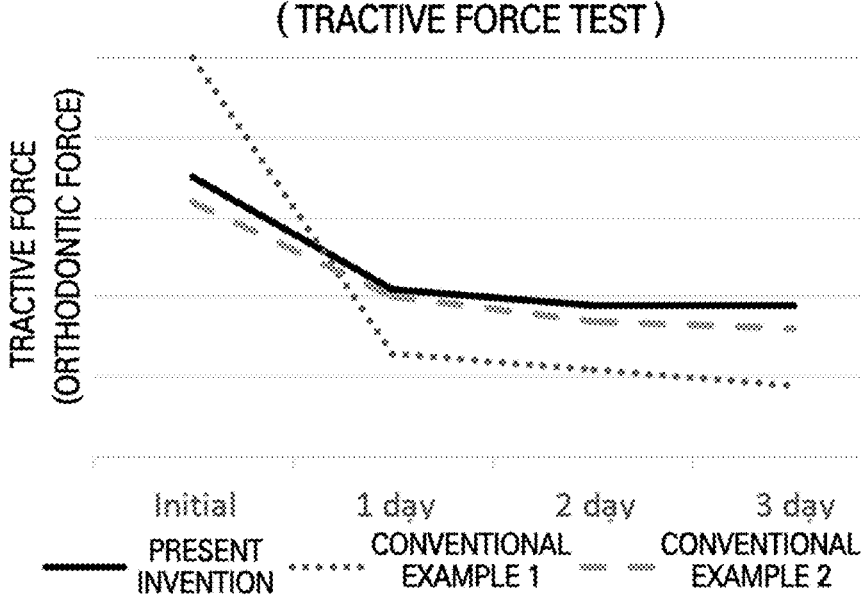
FIG. 10 is a view showing tractive force test data according to the embodiment of the present invention and the conventional examples.
Figure 11:
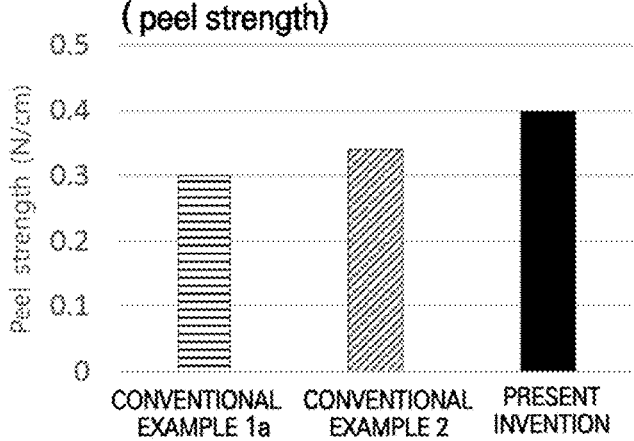
FIG. 11 is a view showing peel strength according to the embodiment of the present invention and conventional examples.
Figure 12:
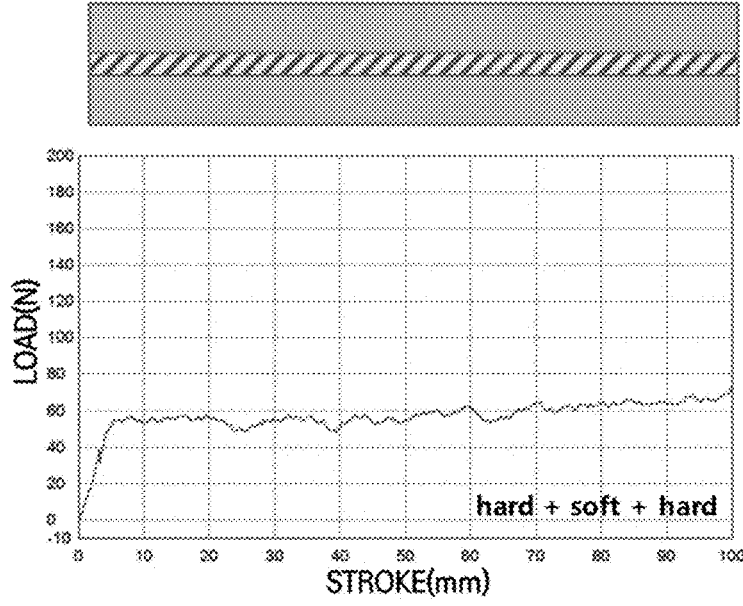
FIG. 12 is a view showing peel strength by stroke according to the conventional example.
Figure 13:
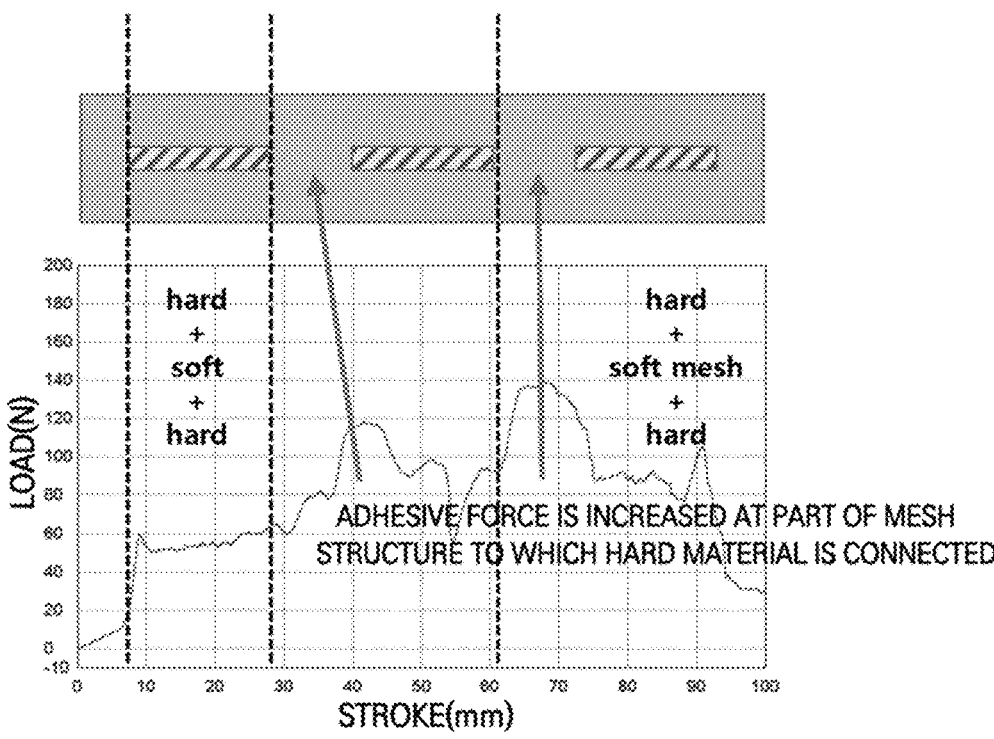
FIG. 13 is a view showing peel strength by stroke according to the present invention.

FIG. 3 is a sectional schematic view of a dental orthodontic sheet according to an embodiment of the present invention. FIGS. 4A and 4B are electron micrographs showing the section of the dental orthodontic sheet according to the embodiment of the present invention. FIGS. 5 to 7 are sectional schematic views of dental orthodontic sheets according to various embodiments of the present invention. FIGS. 8A, 8B, 8C, 8D, 8E, and 8F are schematic views showing various embodiments of a mat portion of an intermediate sheet layer according to the present invention. FIG. 9 is a view showing flexural strength data according to the embodiment of the present invention and conventional examples. FIG. 10 is a view showing tractive force test data according to the embodiment of the present invention and the conventional examples. FIG. 11 is a view showing peel strength according to the embodiment of the present invention and conventional examples. FIG. 12 is a view showing peel strength by stroke according to the conventional example. FIG. 13 is a view showing peel strength by stroke according to the present invention. FIG. 14 is an actual photograph showing the dental orthodontic sheet according to the embodiment of the present invention. FIG. 15 is an actual photograph showing a dental orthodontic device manufactured using the dental orthodontic sheet according to the embodiment of the present invention.

As shown, the dental orthodontic sheet 100 according to the present invention includes a first sheet layer 110, a second sheet layer 120, and an intermediate sheet layer 130 formed between the first sheet layer 110 and the second sheet layer 120. Different materials are bound to each other to constitute a single sheet.

In the present invention, the intermediate sheet layer 130 includes a mesh structure. The first sheet layer 110 and the second sheet layer 120 are connected to each other through the mesh structure, whereby the first sheet layer 110, the second sheet layer 120, and the intermediate sheet layer 130 are securely bound to each other. As a result, poor adhesion or peeling between the different materials is minimized.

The intermediate sheet layer 130 is made of a softer material than the first sheet layer 110 and the second sheet layer 120. The intermediate sheet layer 130 includes a mat portion 131 formed so as to have a mesh structure and a binding portion 132 configured to allow mesh holes of the mat portion 131 to be filled with materials of the first sheet layer 110 and the second sheet layer 120 such that the first sheet layer 110 and the second sheet layer 120 are bound to each other.

In the present invention, the intermediate sheet layer 130 is formed between the first sheet layer 110 and the second sheet layer 120. Consequently, the intermediate sheet layer 130 may constitute a central part of the dental orthodontic sheet 100.

Alternatively, the intermediate sheet layer 130 may be formed so as to be closer to the first sheet layer 110, or may be formed so as to be closer to the second sheet layer 120, in consideration of dentition, dental malocclusion, or abnormal teeth, oral, and maxilla occlusion due to facial asymmetry or upsweep.

In an embodiment of the present invention, on the assumption that the first sheet layer 110 is an outer part of a transparent dental orthodontic device that is exposed outwards, the second sheet layer 120 may be an inner part of the transparent dental orthodontic device that abuts teeth. Alternatively, the first sheet layer 110 may be the inner part of the transparent dental orthodontic device, and the second sheet layer 120 may be the outer part of the transparent dental orthodontic device. The intermediate sheet layer 130 may be located closer to the outwardly exposed part (the first sheet layer 110), or may be located closer to the part that abuts teeth (the second sheet layer 120), in consideration of dentition, dental occlusion, etc.

The mat portion 131 of the intermediate sheet layer 130 is made of a softer material than the first sheet layer 110 and the second sheet layer 120, and is formed so as to have a mesh structure. The binding portion 132 of the intermediate sheet layer 130 allows the mesh holes of the mat portion 131 to be filled with the materials of the first sheet layer 110 and the second sheet layer 120 such that the first sheet layer 110 and the second sheet layer 120 are bound to each other.

That is, the intermediate sheet layer 130 having the mesh structure is formed in a matrix constituted by the first sheet layer 110 and the second sheet layer 120, the first sheet layer 110 and the second sheet layer 120 are connected to each other via the intermediate sheet layer 130. As a result, the different materials are securely bound to each other to constitute a single sheet.

In the present invention, the first sheet layer 110, the second sheet layer 120, and the intermediate sheet layer 130 disposed therebetween are bound to each other due to the nature of materials thereof without necessity of a separate adhesive or adhesion layer. The first sheet layer 110, the second sheet layer 120, and the intermediate sheet layer 130 having the mat portion 131 formed therein are stacked, and are then pressed at an appropriate temperature and pressure (temperature: 150 to 200° C., calendar pressure: 0 to 10 kN, and speed: 1 to 10 m/min) through a hot press rolling process. As a result, the mesh structure is naturally filled with the first sheet layer 110 and the second sheet layer 120, whereby the first sheet layer 110 and the second sheet layer 120 are connected to each other. Consequently, the mat portion 131, the first sheet layer 110, and the second sheet layer 120 are bound to each other.

In the present invention, as described above, the outer part of the dental orthodontic sheet is made of a relatively hard material, whereby the outer part of the dental orthodontic sheet is imparted with orthodontic force, and therefore force is applied to teeth in a desired direction. In addition, the inner part of the dental orthodontic sheet is made of a relatively soft material, whereby the inner part of the dental orthodontic sheet is imparted with flexibility so as to have retentive force and restoring force against deformation, and therefore it is possible to minimize reduction in retentive force.

Also, in the present invention, the mesh structure is adopted in order to bind two or more kinds of materials having different strengths to each other. A hard material and a soft material are used in a state of being appropriately mixed with each other, whereby strength and flexibility are complementarily reinforced. Consequently, required orthodontic force and retentive force are provided, and separation or peeling between different materials is reduced, whereby it is possible to provide a composite structure dental orthodontic sheet with improved durability.

In addition, the intermediate sheet layer is implemented by the mat portion, which is made of a soft material, and the binding portion, which is made of a hard material with which the mesh holes of the mat portion are filled. The hard material and the soft material are repeatedly or compositely implemented, whereby it is possible to maintain orthodontic force and retentive force necessary to perform best orthodontic treatment, to minimize pain of a patient due to excessive orthodontic force at the initial orthodontic stage through flexibility, and to minimize reduction in retentive force through flexibility and restoring force. Consequently, it is possible to obtain results consistent with intended orthodontic treatment, thereby achieving orthodontic success.

In addition, the intermediate sheet layer, in which the hard material and the soft material are repeated, serves to prevent the mat portion made of the soft material from reaching an elongation limit point due to deformation thereof while connecting the first sheet layer and the second sheet layer to each other. Consequently, duration of the retentive force is further increased.

FIG. 3 shows an embodiment of the present invention, wherein arrows are shown to describe the fact that the binding portion 132 serves to prevent the soft material from reaching an elongation limit point and to connect the first sheet layer 110 and the second sheet layer 120 to each other.

FIGS. 4A and 4B are electron micrographs showing the section of the dental orthodontic sheet according to the embodiment of the present invention. It can be seen therefrom that the first sheet layer 110 and the second sheet layer 120 look like a single structure due to the binding portion 132.

In the present invention, the first sheet layer 110 and the second sheet layer 120 may be made of the same material or different materials. That is, the first sheet layer 110 and the second sheet layer 120 may be made of the same material or different materials, whereby the first sheet layer 110 and the second sheet layer 120 may have the same strength or different strengths. For example, the first sheet layer 110, which is the outer part of a transparent dental orthodontic device that is exposed outwards, may be made of a relatively hard material, and the second sheet layer 120, which is the inner part of the transparent dental orthodontic device that abuts teeth, may be made of a relatively soft material. In consideration of orthodontic purpose and direction, the first sheet layer 110 may be made of a relatively soft material, and the second sheet layer 120 may be made of a relatively hard material.

In the present invention, each of the first sheet layer 110 and the second sheet layer 120 may be made of a thermoplastic polymer material. For example, at least one selected from among glycol modified polyethylene terephthalate (PETG), polyester, co-polyester, polypropylene, polyethylene, acrylic, polyetheretherketone, polyimide, polyethylene terephthalate, polybutylene terephthalate, polyetherimide, polyethersulfone, polytrimethylene terephthalate, and thermoplastic polyurethane may be used. Each of the first sheet layer 110 and the second sheet layer 120 may be made of any one of the above materials. As needed, different materials may be selected or appropriately mixed to form a sheet.

In addition, as described above, the first sheet layer 110 and the second sheet layer 120 may be formed so as to have the same thickness or different thicknesses in consideration of dentition, dental occlusion, or oral and maxilla states. This is shown in FIG. 5.

That is, it is possible to adjust the thickness of each of the first sheet layer 110 and the second sheet layer 120 depending on the intensity of orthodontic force based on orthodontic treatment design. When higher orthodontic force is required, it is possible to increase the thickness of each of the first sheet layer 110 and the second sheet layer 120.

It is preferable for each of the first sheet layer 110 and the second sheet layer 120 to have a thickness of 200 to 700 μm. It is more preferable for each of the first sheet layer 110 and the second sheet layer 120 to have a thickness of 200 to 450 μm. The thickness of each of the first sheet layer 110 and the second sheet layer 120 may be appropriately adjusted depending on the intensity of orthodontic force and the thickness of the intermediate sheet layer 130. For example, the thickness of each of the first sheet layer 110 and the second sheet layer 120 may be increased when the intensity of orthodontic force is high.

Each of the first sheet layer 110 and the second sheet layer 120 is made of a transparent material having the following physical properties: flexural modulus of ≥1,000 MPa, flexural strength of 30 to 60 MPa, elongation at break of ≥100%, and transmittance of ≥70.0%.

In the present invention, the mat portion 131 of the intermediate sheet layer 130 may be made of a softer material than the first sheet layer 110 and the second sheet layer 120. For example, at least one selected from among silicone rubber, elastomeric alloy, thermoplastic elastomer (TPE), thermoplastic vulcanizate (TPV) elastomer, polyolefin blend elastomer, thermoplastic co-polyester elastomer, thermoplastic polyamide elastomer, thermoplastic polyurethane (TPU), elastomeric alloy, thermoplastic elastomer (TPE), thermoplastic vulcanizate (TPV) elastomer, thermoplastic co-polyester elastomer, and polyester elastomer may be used. Any one of the above materials may be selected or different materials may be selected or appropriately mixed to manufacture the mat portion 131 having the mesh structure, as needed.

In consideration of dentition, dental occlusion, or oral and maxilla states, the thickness of the mat portion 131 of the intermediate sheet layer 130 may be adjusted together with the thicknesses of the first sheet layer 110 and the second sheet layer 120 in order to adjust orthodontic force and to increase retentive force.

It is preferable for the intermediate sheet layer 130 to have a thickness of 50 to 500 μm. It is more preferable for the intermediate sheet layer 130 to have a thickness of 50 to 250 μm. The thickness of the intermediate sheet layer 130 may be appropriately changed in order to adjust the intensity of orthodontic force and to adjust flexibility. That is, when high intensity of orthodontic force is required, the thickness of the intermediate sheet layer 130 may be decreased. When flexibility is required, the thickness of the intermediate sheet layer 130 may be increased.

The mat portion 131 of the intermediate sheet layer 130 is made of a transparent material softer than the first sheet layer 110 and the second sheet layer 120 while having the following physical properties: hardness of 70 to 90 HRA (Rockwell hardness), flexural strength of 15 to 25 MPa, elongation at break of ≥200%, and transmittance of ≥70.0%.

The mesh structure is formed in the mat portion 131 of the intermediate sheet layer 130. As described above, the first sheet layer 110, the second sheet layer 120, and the mat portion 131 of the intermediate sheet layer 130 are connected to each other through a hot press rolling process. Specifically, the mesh holes of the mat portion 131 are filled with the materials of the first sheet layer 110 and the second sheet layer 120, whereby the first sheet layer 110 and the second sheet layer 120 are connected to each other, and therefore the binding portion 132 is formed to bind the mat portion 131 with the first sheet layer 110 and the second sheet layer 120. That is, the intermediate sheet layer 130 is formed in a matrix constituted by the first sheet layer 110 and the second sheet layer 120.

The binding portion 132 is filled with the materials of the first sheet layer 110 and the second sheet layer 120. The area of the materials of the first sheet layer 110 and the second sheet layer 120 with which the binding portion 132 is filled is adjusted depending on the thickness or material of each of the first sheet layer 110 and the second sheet layer 120. That is, the binding portion 132 may be filled with a mixture of the materials of the first sheet layer 110 and the second sheet layer 120. However, the mixing ratio of the materials of the first sheet layer 110 and the second sheet layer 120 may be changed depending on physical properties thereof.

In addition, the binding portion 132 may be implemented in the state in which a mixing zone (a zone in which the material of the first sheet layer 110 and the material of the second sheet layer 120 are mixed with each other) and a non-mixing zone (a zone in which the material of the first sheet layer 110 and the material of the second sheet layer 120 are not mixed with each other) may be separated from each other or the interface therebetween is changed by gradation. This depends on the materials of the first sheet layer 110 and the second sheet layer 120 or conditions of the hot press rolling process.

In an embodiment of the present invention, the mixing zone is located within 20 to 80% of the height of the binding portion 132 in order to further increase the force of binding between the first sheet layer 110 and the second sheet layer 120. That is, if the mixing zone is located adjacent to the uppermost side of the mesh structure (80% or more of the height thereof) or is located adjacent to the lowermost side of the mesh structure (20% or less of the height thereof), the force of binding between the mixing zone and the mesh structure may be reduced.

The composite structure dental orthodontic sheet 100 including the first sheet layer 110, the second sheet layer 120, and the intermediate sheet layer 130 according to the present invention satisfies the following physical properties: tensile strength of 25 to 50 MPa, flexural modulus of ≥800 MPa, thickness of 300 to 1500 μm (preferably 500 to 1000 μm), and transmittance of ≥80.0%. In addition, traction torque is maintained at an average level of about 50% after 24 hours.

The thickness of the dental orthodontic sheet according to the present invention may be 300 to 1500 μm, preferably 500 to 1000 μm, depending on characteristics of patients and wearing period of the dental orthodontic device.

The reason for this is that, if the thickness of the dental orthodontic sheet is greater than 1500 μm, excessive load is applied to teeth of a patient when the teeth are moved by 1.0 mm or more during orthodontic treatment, whereby the teeth and tissue in the vicinity of the teeth may be injured, which may lead to orthodontic failure. In addition, orthodontic force equal to or greater than a pain threshold may be applied to the patient, whereby the patient may experience pain.

If the thickness of the dental orthodontic sheet is less than 300 μm, on the other hand, orthodontic force is low, whereby orthodontic treatment may not be satisfactorily performed. In addition, the thickness of the dental orthodontic sheet according to the present invention may be appropriately changed depending on characteristics of patients, wearing period, or treatment period. In general, the thickness of the dental orthodontic sheet may be about 500 to 750 μm during initial orthodontic treatment for tooth arrangement, and the thickness of the dental orthodontic sheet may be about 1000 μm in order to maintain tooth arrangement after orthodontic treatment.

In the present invention, as described above, the intermediate sheet layer 130 includes the mat portion 131 and the binding portion 132. The soft material and the hard material are alternately disposed and bound to each other. Consequently, the force of coupling between the first sheet layer 110, the second sheet layer 120, and the intermediate sheet layer 130, which are made of different materials, is further increased, whereby peeling therebetween due to deformation or long-term use thereof may be minimized. In addition, percentages of the mat portion 131 and the binding portion 132 may be changed in order to adjust orthodontic force and flexibility.

In an embodiment of the present invention, the ratio in area of the binding portion 132 to the mat portion 131 is 30 to 70%. That is, on the assumption that the area of the mat portion 131 of the intermediate sheet layer 130 is 100, the area of the binding portion 132 is 30 to 70 in order to achieve optimum flexibility and binding force.

Meanwhile, in the present invention, the mesh structure of the mat portion 131 is not particularly restricted as long as the mesh structure is filled with the materials of the first sheet layer 110 and the second sheet layer 120, whereby binding portion 132 is implemented to connect the first sheet layer 110 and the second sheet layer 120 to each other. For example, the mesh structure may be implemented by a regular pattern or an irregular pattern.

In addition, the mesh structure of the mat portion 131 may be formed as the result of repetition of sparse and dense structures. That is, in order to adjust orthodontic force or flexibility, a part of the intermediate sheet layer 130 may have a small mesh size and another part of the intermediate sheet layer 130 may have a large mesh size such that the mesh structure has different densities depending on the position thereof.

In addition, as shown in FIG. 6, the mesh structure of the mat portion 131 may be formed in a vertical asymmetry. This structure may be usefully adopted when it is necessary to realize a difference in orthodontic force and flexibility between the outside and the inside.

In addition, a buffer coating layer 133 may be further formed on the surface of the mesh structure of the mat portion 131. The buffer coating layer 133 may be made of a material that exhibits strength equal to or less than the strength of each of the first sheet layer 110 and the second sheet layer 120.

FIG. 7 shows the mat portion 131 having the buffer coating layer 133 formed thereon. The buffer coating layer 133 is made of a material that exhibits strength equal to or less than the strength of each of the first sheet layer 110 and the second sheet layer 120 (a material that exhibits strength greater than the strength of the mat portion 131) in order to further increase the force of binding between the first sheet layer 110 and the second sheet layer 120. That is, the buffer coating layer 133 is made of a material that exhibits strength between the strength of the mat portion 131 and the strength of each of the first sheet layer 110 and the second sheet layer 120. When the first sheet layer 110 and the second sheet layer 120 are bound to each other, therefore, the buffer coating layer 133 serves to buffer the difference in interfacial properties between different materials.

The buffer coating layer 133 may be made of any one selected from among glycol modified polyethylene terephthalate (PETG), polyester, co-polyester, polypropylene, polyethylene, acrylic, polyetheretherketone, polyamide, polyethylene terephthalate, polybutylene terephthalate, polyetherimide, polyethersulfone, polytrimethylene terephthalate, thermoplastic polyurethane, silicone rubber, elastomeric alloy, thermoplastic elastomer (TPE), thermoplastic vulcanizate (TPV) elastomer, polyolefin blend elastomer, thermoplastic co-polyester elastomer, thermoplastic polyamide elastomer, thermoplastic polyurethane (TPU), elastomeric alloy, thermoplastic elastomer (TPE), thermoplastic vulcanizate (TPV) elastomer, thermoplastic co-polyester elastomer, and polyester elastomer. The buffer coating layer 133 may be formed on the mat portion 131 by soaking or spray coating. It is appropriate for the thickness of the buffer coating layer 133 to be about 5 to 10 μm.

FIGS. 8A, 8B, 8C, 8D, 8E, and 8F show various embodiments of the mesh structure. Furthermore, the mesh structure may be configured to have any of other shapes, such as a stripe pattern or a curved pattern, as long as the binding portion 132 is implemented. The extent to which the mesh structure is sparse or dense is adjusted depending on orthodontic force and flexibility.

In the present invention, the surface of the mat portion 131 of the intermediate sheet layer 130 may be further treated with plasma. The surface contact angle of the mat portion 131 is changed in order to adjust the coupling force between the first sheet layer 110 and the second sheet layer 120 or to further increase the coupling force therebetween.

In general, surface treatment may be performed using various known methods. For example, hydrophilic surface treatment may be implemented by formation of an oxide layer on the mat portion 131 or oxygen plasma surface treatment. Hydrophobic surface treatment may be implemented by coating or plasma treatment of a hydrophobic material.

Hereinafter, measured data of various physical properties of a dental orthodontic sheet according to an embodiment of the present invention will be described.

In an embodiment of the present invention, each of the first sheet layer and the second sheet layer was made of glycol modified polyethylene terephthalate (PETG), and had the following physical properties: flexural modulus of 2000 to 2200 MPa, flexural strength of 50 to 55 MPa, elongation at break of 150%, transmittance of ≥80.0%, surface tension of 36 dyne/cm, and shrinkage tested at 105° C. for 5 min: MD: ≥−2.0%, TD: ≤+2.0%, and Vicat: 69.0±2.0° C. The thickness of the first sheet layer was 300 μm, and the thickness of the second sheet layer was 350 μm.

In an embodiment of the present invention, the mat portion of the intermediate sheet layer was made of thermoplastic polyurethane (TPU), and had the following physical properties: hardness of 80±2 HRA, flexural strength of 25 to 30 MPa, elongation at break of 550%, tear strength of 60 kg/cm, UV resistance of grayscale 3.5, and thickness of 100 μm.

A transparent dental orthodontic sheet according to an embodiment of the present invention manufactured using the first sheet layer, the second sheet layer, and the intermediate sheet layer had the following physical properties: flexural strength of 32 to 39 MPa, flexural modulus of 1200 to 1300 MPa, transmittance of 90.0%, thickness of 750 μm (650 μm for hard material and 100 μm for soft material), peeling strength of 0.3 N/cm. In addition, traction torque was maintained at an average level of about 60% after 24 hours.

Figure 1:
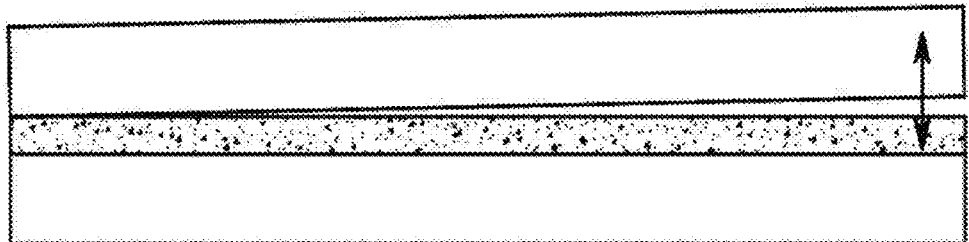
FIGS. 1 and 2 are schematic views of a conventional dental orthodontic sheet.
Figure 2:
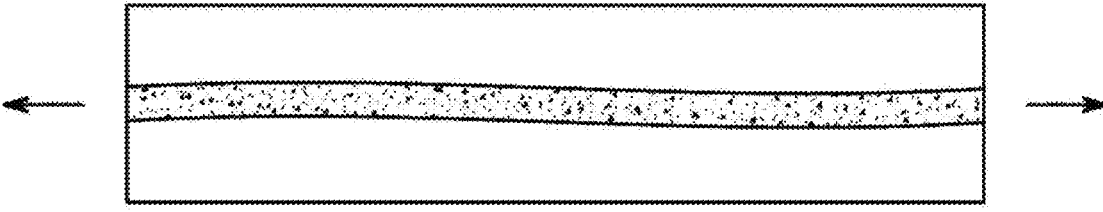

FIG. 9 shows flexural strength data according to the embodiment of the present invention and conventional examples. Conventional example 1 is a single-layered sheet made of glycol modified polyethylene terephthalate (PETG) and conventional example 2 is a multilayered sheet of PETG/TPU (single soft material)/PETG (structure shown in FIGS. 1 and 2).

As shown in FIG. 9, it can be seen that the embodiment of the present invention has lower strength than the single-layered sheet and similar strength to the multilayered sheet. When a patient initially wears each of the conventional dental orthodontic sheets, the patient may experience pain due to excessive orthodontic force. The dental orthodontic sheet according to the present invention reduces patient pain, and therefore the patient may wear the dental orthodontic sheet in comfort.

FIG. 10 shows tractive force test data according to the embodiment of the present invention and the conventional examples, i.e. conventional example 1 and conventional example 2, for comparison.

As shown in FIG. 10, it can be seen that, in the dental orthodontic sheet according to the embodiment of the present invention, orthodontic force is more slowly reduced than the single-layered sheet, whereby final orthodontic force is high. That is, deformation of the dental orthodontic sheet according to the embodiment of the present invention is less than deformation of the single-layered sheet at a tooth deformation position, whereby retentive force is increased.

That is, it can be seen that the embodiment of the present invention adopts the intermediate sheet layer, which is made of a soft material, while having initial appropriate strength, compared to the conventional examples, whereby retentive force is high, and therefore final orthodontic force is high.

FIG. 11 shows peel strength according to the embodiment of the present invention and conventional examples (conventional example 1a is a multilayered sheet of polytrimethylene terephthalate/TPU/polytrimethylene terephthalate).

As shown in FIG. 11, it can be seen that the dental orthodontic sheet according to the embodiment of the present invention adopts the intermediate sheet layer made of the soft material and including the mesh structure, whereby adhesive force is increased, compared to the multilayered sheet including the single soft material (conventional example 1a and conventional example 2). Consequently, it can be seen that the dental orthodontic sheet according to the embodiment of the present invention has high interlayer adhesive force and durability while exhibiting high retentive force.

FIG. 12 shows peel strength by stroke according to conventional example 2 (multilayered sheet), and FIG. 13 shows peel strength by stroke according to the embodiment of the present invention. In the present invention, the intermediate sheet layer made of the soft material and including the mesh structure is adopted, and the mesh holes are filled with the hard material when the dental orthodontic device is formed, whereby the mesh holes are connected to each other via the hard material. As a result, it is possible to remedy problems with the conventional multilayered sheet in that peeling and stretching of the multilayered sheet occur and to increase retentive force.

FIG. 14 is an actual photograph showing the dental orthodontic sheet according to the embodiment of the present invention, and FIG. 15 is an actual photograph showing a dental orthodontic device manufactured using the dental orthodontic sheet according to the embodiment of the present invention.

As shown in FIG. 14, a dental orthodontic sheet according to the present invention is manufactured through a hot press rolling process. Subsequently, teeth are scanned, and a tooth model is manufactured using a 3D printer. Subsequently, the composite structure dental orthodontic sheet according to the present invention is thermally shaped along the tooth model using a Biostar, and a final tooth model is formed using an aligner, whereby a dental orthodontic device according to the present invention is manufactured. FIG. 15 shows an actual product of the dental orthodontic device according to the present invention thus manufactured.

The present invention relates to a dental orthodontic sheet having a composite structure in which different materials are stacked and bound, and more particularly to a hybrid composite structure dental orthodontic sheet including a soft material and a hard material.

Particularly, in the present invention, a mesh structure is adopted in order to bind two or more kinds of materials having different strengths to each other. A hard material and a soft material are used in a state of being appropriately mixed with each other, whereby strength and flexibility are complementarily reinforced. Consequently, required orthodontic force and retentive force are provided, and separation or peeling between different materials is reduced, whereby it is possible to provide a composite structure dental orthodontic sheet with improved durability.

Also, in the present invention, an outer part of the dental orthodontic sheet is made of a relatively hard material, whereby the outer part of the dental orthodontic sheet is imparted with orthodontic force, and therefore force is applied to teeth in a desired direction. In addition, an inner part of the dental orthodontic sheet is made of a relatively soft material, whereby the inner part of the dental orthodontic sheet is imparted with flexibility so as to have retentive force and restoring force against deformation, and therefore it is possible to minimize reduction in retentive force.

Also, in the present invention, an intermediate sheet layer is implemented by a mat portion made of a soft material and a binding portion made of a hard material with which mesh holes of the mat portion are filled. The hard material and the soft material are repeatedly or compositely implemented, whereby it is possible to maintain orthodontic force and retentive force necessary to perform best orthodontic treatment, to minimize pain of a patient due to excessive orthodontic force at the initial orthodontic stage through flexibility, and to minimize reduction in retentive force through flexibility and restoring force. Consequently, it is possible to obtain results consistent with intended orthodontic treatment, thereby achieving orthodontic success.

In addition, the intermediate sheet layer, in which the hard material and the soft material are repeated, serves to prevent the mat portion made of the soft material from reaching an elongation limit point due to deformation thereof while connecting the first sheet layer and the second sheet layer to each other. Consequently, duration of the retentive force is further increased.

What is claimed is:

1. A composite structure dental orthodontic sheet for manufacturing a transparent orthodontic device by shaping according to a tooth model, comprising:

a first sheet layer made of a first material;

a second sheet layer made of a second material; and an intermediate sheet layer formed between the first sheet layer and the second sheet layer, wherein the intermediate sheet layer comprises:

a mat portion made of a third material, the third material having a flexural strength smaller than a flexural strength of each of the first and second materials, the mat portion including a mesh structure that defines mesh holes, wherein the first material of the first sheet layer and the second material of the second sheet layer are filled in the mesh holes, thereby forming a bond between the first sheet layer and the second sheet layer through the mesh holes.

2. The composite structure dental orthodontic sheet according to claim 1, wherein the first material and the second material are the same material or different materials, or the first sheet layer and the second sheet layer are formed so as to have the same thickness or different thicknesses.

3. The composite structure dental orthodontic sheet according to claim 2, wherein each of the first sheet layer and the second sheet layer comprises at least one selected from the group consisting of glycol modified polyethylene terephthalate (PETG), polyester, co-polyester, polypropylene, polyethylene, acrylic, polyetheretherketone, polyamide, polyethylene terephthalate, polybutylene terephthalate, polyetherimide, polyethersulfone, polytrimethylene terephthalate, and thermoplastic polyurethane.

4. The composite structure dental orthodontic sheet according to claim 2, wherein each of the first sheet layer and the second sheet layer has a thickness of 200 to 700 μm.

5. The composite structure dental orthodontic sheet according to claim 1, wherein the mat portion of the intermediate sheet layer comprises at least one selected from the group consisting of silicone rubber, elastomeric alloy, thermoplastic elastomer (TPE), thermoplastic vulcanizate (TPV) elastomer, polyolefin blend elastomer, thermoplastic co-polyester elastomer, thermoplastic polyamide elastomer, thermoplastic polyurethane (TPU), elastomeric alloy, thermoplastic elastomer (TPE), thermoplastic vulcanizate (TPV) elastomer, thermoplastic co-polyester elastomer, and polyester elastomer.

6. The composite structure dental orthodontic sheet according to claim 1, wherein the intermediate sheet layer has a thickness of 50 to 500 μm.

7. The composite structure dental orthodontic sheet according to claim 1, wherein the mesh structure of the mat portion has a regular pattern or an irregular pattern, or the mesh structure of the mat portion includes first and second regions, the first region having a first mesh size, the second region having a second mesh size greater than the first mesh size.

8. The composite structure dental orthodontic sheet according to claim 1, wherein the intermediate sheet layer is configured such that a ratio in area of the mesh holes to the mat portion is 30 to 70%.

9. The composite structure dental orthodontic sheet according to claim 1, wherein the mesh structure of the mat portion is formed in vertical asymmetry.

10. The composite structure dental orthodontic sheet according to claim 1, wherein a buffer coating layer is further formed on a surface of the mesh structure of the mat portion.

11. The composite structure dental orthodontic sheet according to claim 10, wherein the buffer coating layer is made of a material that exhibits strength equal to or less than strength of each of the first sheet layer and the second sheet layer.

12. The composite structure dental orthodontic sheet according to claim 1, wherein a surface of the mat portion of the intermediate sheet layer is treated with plasma.

13. The composite structure dental orthodontic sheet according to claim 1, wherein each of the first sheet layer and the second sheet layer has a flexural strength of 30 to 60 MPa, and the intermediate sheet layer has a flexural strength of 15 to 25 MPa.

14. The composite structure dental orthodontic sheet according to claim 1, wherein the composite structure dental orthodontic sheet is formed by stacking the first sheet layer, the intermediate sheet layer, and the second sheet layer and pressing the first sheet layer, the intermediate sheet layer, and the second sheet layer through a hot press rolling process.

15. A dental orthodontic device using the composite structure dental orthodontic sheet according to claim 1.

* * * * *